(12) United States Patent
Nguyen et al.

(10) Patent No.: US 7,373,546 B2
(45) Date of Patent: May 13, 2008

(54) CLUSTER NETWORK WITH REDUNDANT COMMUNICATION PATHS

(75) Inventors: Nam V. Nguyen, Round Rock, TX (US); Daniel Moges, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 597 days.

(21) Appl. No.: 10/896,385

(22) Filed: Jul. 22, 2004

(65) Prior Publication Data

US 2006/0020711 A1    Jan. 26, 2006

(51) Int. Cl.
G06F 11/00 (2006.01)
G06F 11/16 (2006.01)

(52) U.S. Cl. ............................ 714/5; 714/4; 714/43

(58) Field of Classification Search .................. 714/4, 714/5, 43
See application file for complete search history.

(56) References Cited

U.S. PATENT DOCUMENTS

| | | | | |
|---|---|---|---|---|
| 5,729,763 A * | 3/1998 | Leshem | ................ | 710/38 |
| 5,757,642 A * | 5/1998 | Jones | ................ | 700/5 |
| 5,812,754 A * | 9/1998 | Lui et al. | ................ | 714/6 |
| 6,658,504 B1 * | 12/2003 | Lieber et al. | ................ | 710/52 |
| 6,678,839 B2 * | 1/2004 | Mori | ................ | 714/44 |
| 6,895,480 B2 * | 5/2005 | Heil | ................ | 711/153 |
| 7,039,741 B2 * | 5/2006 | Bakke et al. | ................ | 710/300 |
| 7,085,958 B2 * | 8/2006 | El-Batal | ................ | 714/8 |
| 7,240,234 B2 * | 7/2007 | Morita et al. | ................ | 714/4 |
| 7,302,615 B2 * | 11/2007 | Sakai | ................ | 714/43 |
| 2006/0236028 A1 * | 10/2006 | Tanaka et al. | ................ | 711/112 |

OTHER PUBLICATIONS

Wikipedia's RAID revision from Jun. 16, 2004, first page http://en.wikipedia.org/w/index.php?title=RAID&oldid=4127851.*
ThomasNet Archive News Story "Enclosures PRovide Over 2 TB of Storage Capacity" Oct. 17, 2003 http://news.thomasnet.com/fullstory/27213.*
SearchNetworking.com definition of File Server Feb. 23, 2003 http://serachnetworking.techtarget.com/sDefinition/0,290660,sid7_gci881593,00.html.*
Google definitions of "File Server" retrieved Jun. 1, 2007.*

* cited by examiner

*Primary Examiner*—Scott Baderman
*Assistant Examiner*—Joseph Schell
(74) *Attorney, Agent, or Firm*—Baker Botts L.L.P.

(57) ABSTRACT

A cluster network is provided in which the storage enclosures of the network are grouped into storage sets or columns of storage enclosures. Each server node of the cluster network is coupled to an interface of the storage enclosure of each of the storage sets. The storage enclosure within each set are coupled together to provide a redundant peer communications link between the server nodes.

27 Claims, 3 Drawing Sheets

CLUSTER NETWORK WITH REDUNDANT COMMUNICATION PATHS

TECHNICAL FIELD

The present disclosure relates generally to the field of networks, and, more particularly, to a cluster network that includes redundant communication paths.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computers, including servers and workstations, are often grouped in clusters to perform specific tasks. A server cluster is a group of independent servers that are coupled together and managed as a single system. Compared with groupings of unmanaged servers, a server cluster is characterized by higher availability, manageability, and scalability. A server cluster typically involves the configuration of a group of servers such that the servers appear in the network as a single machine or unit. At a minimum, a server cluster includes two servers, which are sometimes referred to as nodes, that are connected to one another by a network or other communication links. A storage network may be coupled to the server cluster. A storage network will typically include one or more storage devices that may or may not be shared by the servers of the server cluster. A storage network will may include one or more storage enclosures, which may house a plurality of disk-based hard drives.

The servers of the cluster server may communicate with the storage network according to the Serial Attached SCSI (SAS) communications protocol. Serial Attached SCSI is a storage network interface that is characterized by a serial, point-to-point architecture. In addition, the storage of a cluster network may include some element of fault tolerant storage. One example of fault tolerant storage is RAID (Redundant Array of Inexpensive Disks) storage. RAID storage involves the organization of multiple disks into an array of disks to obtain performance, capacity, and reliability advantages.

SUMMARY

In accordance with the present disclosure, a cluster network is provided in which the storage enclosures of the networked are grouped into storage sets or columns of storage enclosures. Each storage enclosure includes dual interfaces. The cluster network includes server nodes. Each server node is coupled to an interface of a storage enclosure in the first set of storage enclosures and an interface of a storage enclosure in the second set of storage enclosures. Within each set of storage enclosures, each interface of each storage enclosure is coupled to an interface of an adjacent storage enclosure. The interfaces of a terminal storage enclosure are coupled to one another.

The cluster network disclosed herein is technically advantageous because it involves a separation of the storage enclosures of the network into at least two groups. The result of this separation and the topology of the individual groupings is that the failure of one or more of the storage enclosures of one of the sets will not prevent peer communications between the server nodes. Because of the network architecture disclosed herein, communications between server nodes may be routed through the enclosure interface controllers of either of the sets of storage enclosures. The network described herein is thus made more reliable, as the network is able to support peer communications despite the failure of a storage enclosure.

Another technical advantage of the architecture disclosed herein is cluster network disclosed herein may be implemented using enclosure interface controllers that include only two ports. Because of the design of the network disclosed herein it is not necessary to couple both server nodes to a single interface controller, thereby eliminating the need for an interface controller that includes three ports. In the cluster network disclosed herein, each enclosure interfaced controller includes two ports, reducing complexity in the design and implementation of the cluster network. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
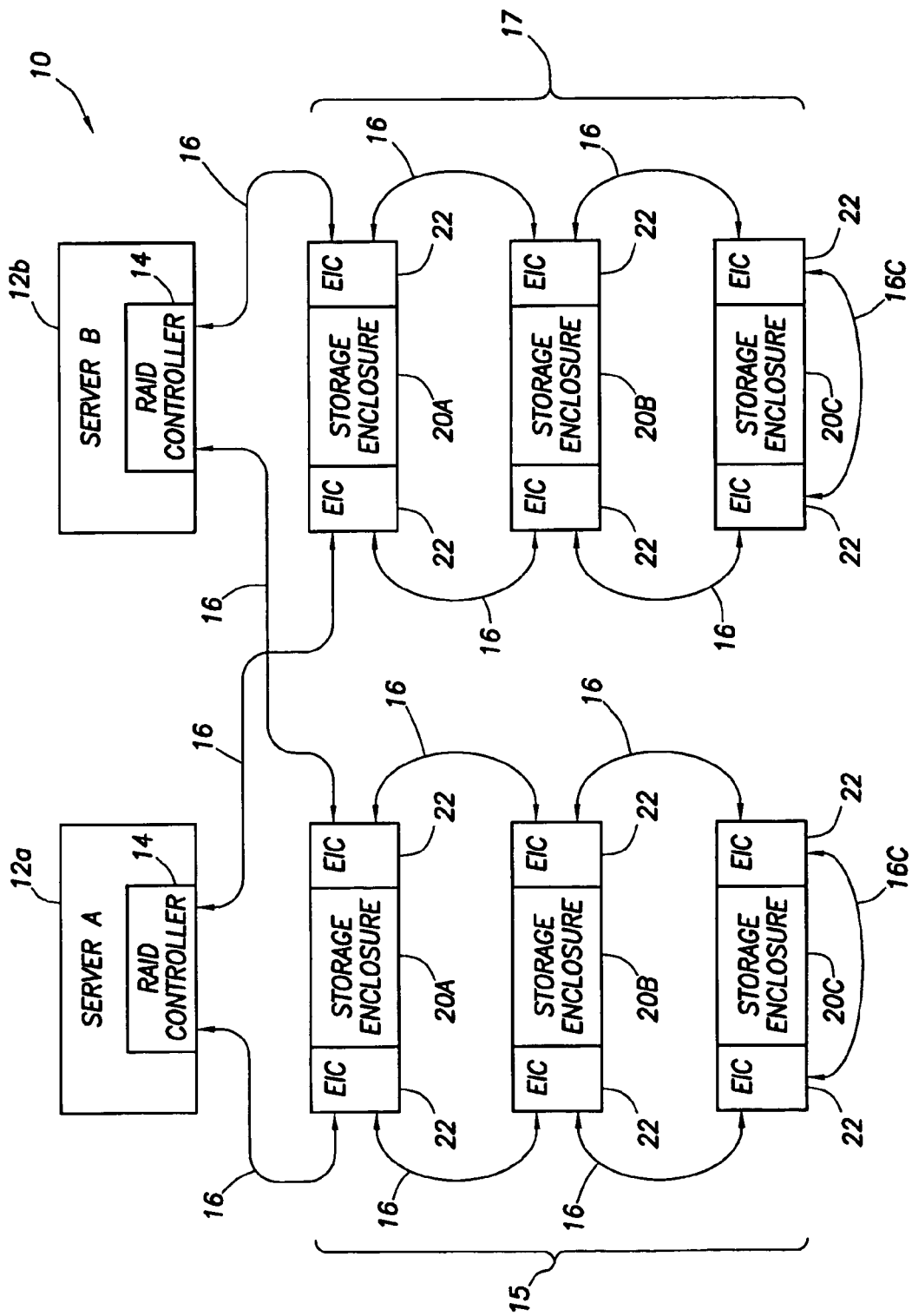
FIG. 1 is a diagram of a cluster network.

Shown in FIG. 1 is cluster network, which is indicated generally at 10. Cluster network 10 includes two servers 12 arranged in a server cluster. The servers are identified as Server A at 12a and Server B at 12b. Each server 12 includes at least one RAID controller 14, which may be included in each server as a card that is included in the PCI (Peripheral Component Interconnect) slot of the server. Each server 12 may include multiple RAID controllers 14. RAID controller 14 manages the data access to the storage drives maintained in the storage enclosures of the cluster network. RAID controller 14 may also maintain a write-back cache for storing writes to the drives managed by RAID controller 14. Cluster network 10 includes a number of storage enclosure 20. In the network diagram of FIG. 1, six storage enclosures 20 are shown. The storage enclosures are arranged into two sets or columns, which are shown in FIG. 1 as a first set or column 15 of storage enclosures and a second set or column 17 of storage enclosures. The first storage enclosure in each set of storage enclosures is referred to herein as the gateway storage enclosure 20A. Each storage enclosure 20 is a dual interface enclosure. Each interface of storage enclosure 20 is managed by an enclosure interface controller (EIC) 22.

Each RAID controller of each server is coupled to the gateway storage enclosure 20 in the first enclosure set or enclosure column 15 and the gateway storage enclosure 20A in the second set or column 17. With reference to Server A, Server A is coupled through a communications link 16 to the enclosure interface controller 22 of the gateway storage enclosure 20A of the first column 15 and through a separate communications link 16 to the enclosure interface controller 22 of the gateway storage enclosure 20A of the second column 17. With reference to Server B, Server B is coupled to the enclosure interface controller 22 of the gateway storage enclosure 20A of the first column 15 and to the enclosure interface controller 22 of the gateway storage enclosure 20A of the second column 17. Server A and Server B are not coupled to the same enclosure interface controller of a gateway storage enclosure. Instead, Server A and Server B are coupled to opposite enclosure interface controllers of each of the two gateway storage enclosures.

Each enclosure interface controller 22 includes dual ports. Each port is operable to receive and transmit data. Enclosure interface controller 22 of the gateway storage enclosure 20 of enclosure column 15 is coupled through a communications link 16 to an enclosure interface controller 22 of the next following storage enclosure in the enclosure column 15. Enclosure interface controller 22 of the gateway storage enclosure 20 of enclosure column 17 is coupled through a communications link 16 to an enclosure interface controller 22 of the next following storage enclosure in the enclosure column 17. The next following storage enclosure of enclosures 15 and 17 are referred to herein as intermediate storage enclosures 20B. The enclosure interface controller 22 of the intermediate storage enclosure 20B of enclosure column 15 is coupled through a communications link 16 to an enclosure interface controller 22 of a terminal storage enclosure 20C.

The enclosure interface controller 22 of the intermediate storage enclosure 20B of enclosure column 17 is coupled through a communications link 16 to an enclosure interface controller 22 of a terminal storage enclosure 20C. Terminal storage enclosures 20C are so named because each is the last enclosure in each of enclosure column 15 and enclosure column 17.

The architecture of the enclosure column 17 is just one example of the architecture of an enclosure column. An enclosure column may include multiple intermediate storage enclosures 20B; an enclosure column may also include no storage enclosures 20B. An enclosure column must include one gateway enclosure and one terminal enclosure. If the enclosure column includes only a single enclosure, the single enclosure is both the gateway enclosure and the terminal enclosure.

Each enclosure interface controller 22 of each terminal storage enclosure 20 is coupled by a communications link 16C to the opposite enclosure interface controller 22 of the same terminal storage enclosure 20C. As shown in FIG. 1, communications link 16C provides a wrap-around communications link between the enclosure interface controllers of the each terminal storage enclosure. As indicated in the architectural diagram of FIG. 1, a communications transmission could be routed throughout the storage enclosures of an enclosure column by routing the transmission through a series of enclosure interface controllers and, if necessary, communications link 16C. As an example, a data transmission received at one enclosure interface controller 22 of gateway storage enclosure 20A could be routed to the opposite enclosure interface controller 22 of the same gateway storage enclosure 20A. The data transmission is first routed to the enclosure interface controller of the intermediate storage enclosure and on to the enclosure interface controller of the terminal storage enclosure. Once the data transmission is received at the enclosure interface controller of the terminal storage enclosure 16C, the data transmission is transferred via wrap-around or terminal communications link 16C to the opposite enclosure interface controller of terminal storage enclosure 16C. Data received by the opposite enclosure interface controller of terminal storage enclosure 20C is then routed through enclosure interface controller of the intermediate storage enclosure 20B and on to the opposite enclosure interface controller of gateway storage enclosure 20A.

Figure 2:
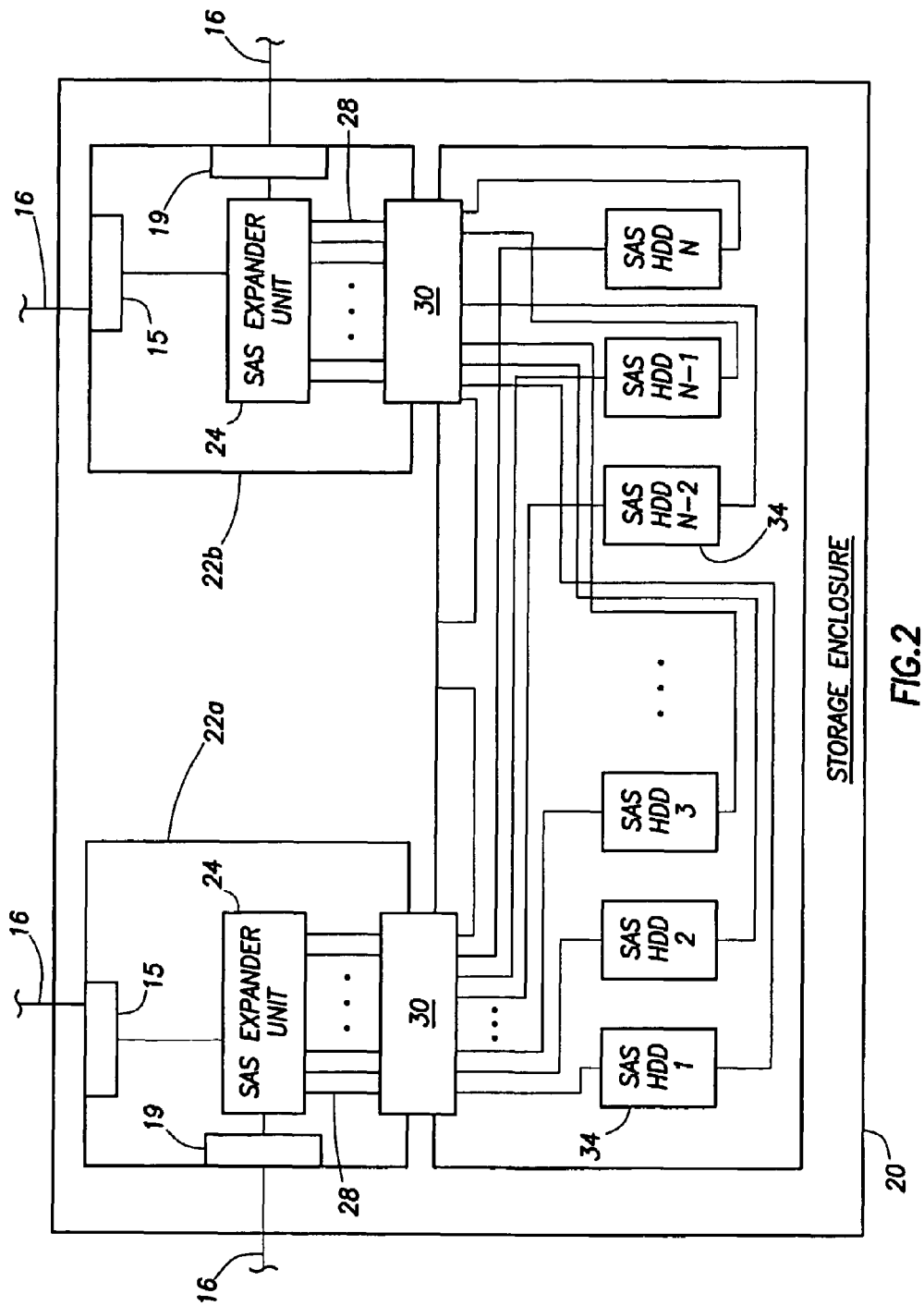
FIG. 2 is a diagram of a storage enclosure.

Each storage enclosure 20 is a dual interface enclosure, and each interface is managed by an enclosure interface controller (EIC) 22. Shown in FIG. 2 is a block diagram of a storage enclosure 20. Storage enclosure 20 includes two enclosure interface controllers, which are identified at 22a and 22b. Each of the enclosure interface controllers 22 includes a host port 15 and an expansion port 19. The port 15 and expansion port 19 are each coupled to a communications link 16. Host port 15 and expansion port 19 are each coupled to an expander unit 24, which will typically comprises an edge expander. SAS expander unit 24, host port 15, and expansion port 19 comprise an enclosure interface controller 22. SAS expander unit 24 provides a switching fabric for routing data between host port 15 and expansion port 19. SAS expander unit 24 is coupled to a plurality of point-to-point connections 28, each of which is coupled to a connector device 30. Connector device 30 is a high speed connector that serves as a routing interface between enclosure interface controller 22 and the SAS storage drives 34. As indicated in FIG. 2, each SAS drive 34 has dual ports, allowing each of the SAS storage drives to be coupled to and accessed by each of the enclosure interface controllers 22.

The diagram of the storage enclosure 20 of FIG. 2 is representative of each of the gateway storage enclosure 20a, intermediate storage enclosure 20b, and terminal storage enclosure 20c.

Figure 3:
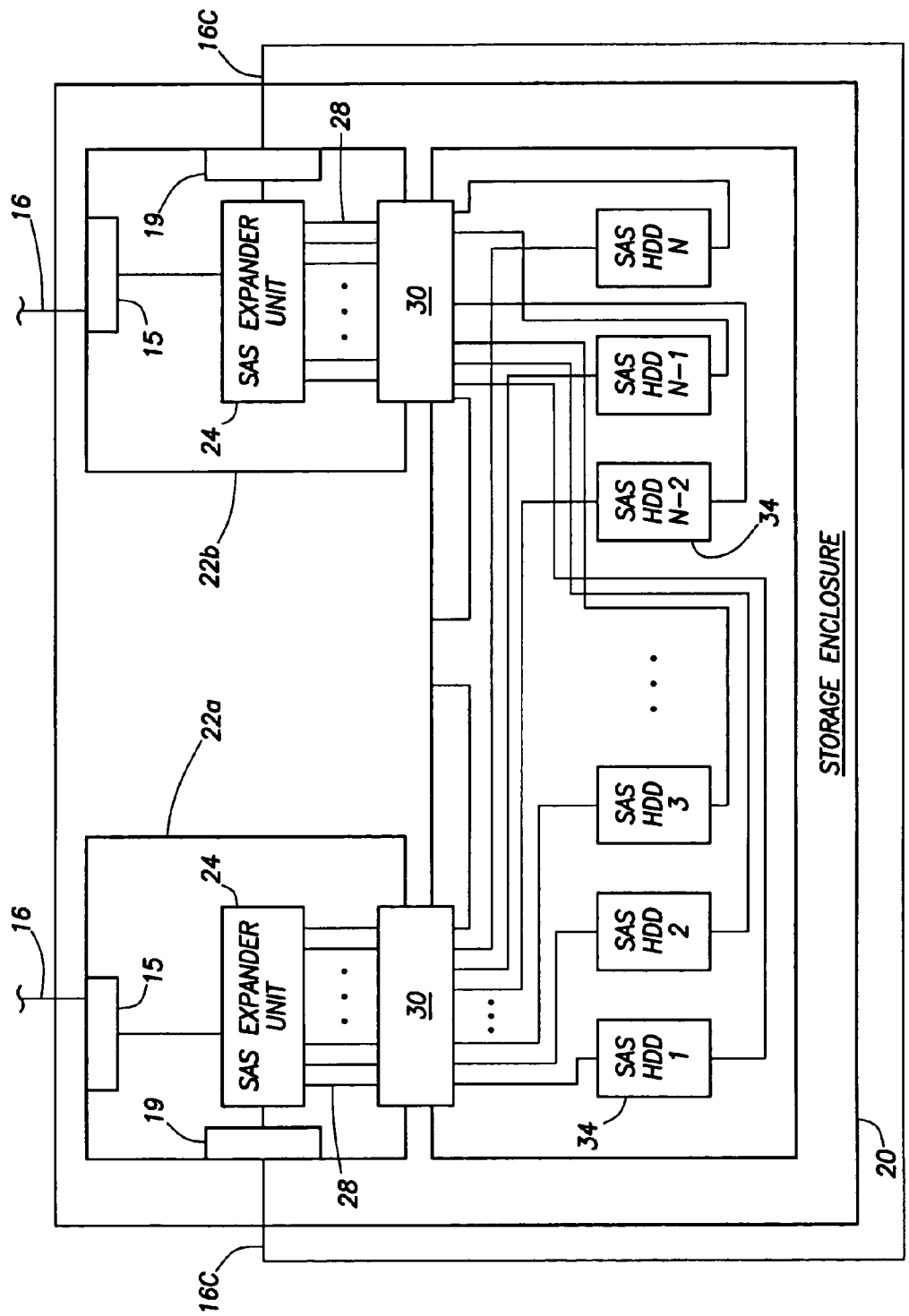
FIG. 3 is a diagram of a storage enclosure that includes a communications link between the interface controllers of the storage enclosure.

An additional diagram of terminal storage enclosure 20c is shown in FIG. 3. The enclosure interface controllers 22 terminal storage enclosure 20c of FIG. 3 are coupled to one another through the terminal communications link 16c. The interconnection of the terminal storage enclosures 20c through the terminal communications link provides a communications pathway so that a communication from Server A to Server B can be accomplished by routing the communication through each enclosure interface controller of each storage enclosure of either storage column 15 or storage column 17.

With reference to FIG. 1, the servers 12 of the cluster network communicate with one another as peer nodes. The placement of a redundant communications link between each of the servers 12 is useful or necessary for failure recovery and configuration management in the cluster network. If one of the servers were to fail or if it were necessary for a server to transfer ownership of data or applications to the other server, data necessary for initiating or restarting the applications on another node is communicated between the servers. With respect to configuration management, servers 12 must communicate with one another concerning the configuration of RAID arrays on the drives of the storage enclosure and the assignment of drives to a RAID array. After a RAID controller of a server has reserved a set of storage drives for a RAID array, an identification of the reserved storage drives is communicated to the other servers of the storage network. The network architecture of the cluster network that is disclosed herein provides for communication between the server nodes despite the failure of a storage enclosure, including the gateway storage enclosure, in either of the storage columns.

In operation, communications between Server A and Server B can occur despite the failure the gateway storage enclosure 20a of storage column 15. RAID controller 14 of Server is operable to transmit a communication across communications link 16 to the enclosure interface controller 22 of gateway storage enclosure 20a of storage column 17. This communication is next routed in sequence to the connected enclosure interface controller 22 of intermediate storage enclosure 20b and to the connected enclosure interface controller of terminal storage enclosure 20c. The communication is next routed across the wrap-around communications link 16c to the opposite enclosure interface controller 22 of terminal storage enclosure 20c. The communication is then routed in sequence to the enclosure interface controller of the connected intermediate storage enclosure, the enclosure interface controller of the gateway storage enclosure, and the RAID controller of Server B. In this manner, the failure of one or more storage enclosures in one storage column will not disable communications between the server nodes, as communications between the server nodes can be routed through each of the enclosure interface controllers of each of the storage enclosures of the other storage column. Because of the dual column configuration of the storage enclosures of the cluster network, the failure of a single storage enclosure does not disrupt communications between the server nodes of the cluster network. The architecture of the cluster network disclosed herein provides for a redundant peer-to-peer link between the two server nodes of the cluster network.

A cluster network that includes the cluster network disclosed herein may include multiple set of storage enclosures, and each storage set may have fewer or more than three storage enclosures. As an example, a storage column could include two storage enclosures, with the first storage enclosure being identified as the gateway storage enclosure and the other storage enclosure being identified as the terminal storage enclosure. It should also be recognized that the architecture or topology of the network disclosed herein is one example of a cluster network having the specific architecture or topology disclosed herein. Rather, the specific architecture or topology disclosed herein is an example of an architecture for a cluster network in which the storage enclosures of the cluster network are separated into sets or columns for the sake of the reliability of the cluster network. Although the present disclosure has been described in detail, it should be understood that various changes, substitutions, and alterations can be made hereto without departing from the spirit and the scope of the invention as defined by the appended claims.

What is claimed is:

1. A cluster network, comprising:
   a first server node;
   a second server node, wherein each of the first server node and the second server node includes a storage controller;
   a first set of storage enclosures;
   a second set of storage enclosures, wherein each of the first set of storage enclosures and the second set of storage enclosures comprises;
      a gateway storage enclosure that includes first and second interface controllers, wherein the first interface controller is directly coupled to the first server node and the second interface controller is directly coupled to the second server node; and
      a terminal storage enclosure that includes first and second interface controllers, wherein the first interface controller is directly coupled to the first interface controller of the gateway storage enclosure and the second interface controller is directly coupled to the second interface controller of the gateway storage enclosure, and wherein the first interface controller of the terminal storage enclosure is directly coupled to the second interface controller of the terminal storage enclosures;
   whereby a communications pathway exists between the server nodes through the first and second interface controllers of the storage enclosures in the first set of storage enclosures despite a failure of a storage enclosure in the second set of storage enclosures.

2. The cluster network of claim 1, wherein the storage controller of the first server node and the storage controller of the second server node are RAID storage controllers.

3. The cluster network of claim 1, wherein each storage enclosure includes a plurality of dual port storage drives, wherein each of the storage drives of a storage controller is coupled to each of the interface controllers of the storage enclosure.

4. A cluster network, comprising:
   a first server node;
   a second server node, wherein each of the first server node and the second server node includes a storage controller;
   a first set of storage enclosures; and
   a second set of storage enclosures, wherein each of the first set of storage enclosures and the second set of storage enclosures comprises:
      a gateway storage enclosure that includes first and second interface controllers, wherein the first interface controller is coupled to the first server node and the second interface controller is coupled to the second server node; and a terminal storage enclosure that includes first and second interface controllers, wherein the fast interface controller is coupled to the first interface controller of the gateway storage enclosure and the second interface controller is coupled to the second interface controller of the gateway storage enclosure, and wherein the first interface controller of the terminal storage enclosure is coupled to the second interface controller of the terminal storage enclosure;

whereby a communications pathway exists between the server nodes through the first and second interface controllers of the storage enclosures in the first set of storage enclosures despite a failure of a storage enclosure in the second set storage enclosures, wherein each storage enclosure includes a plurality of dual port storage drives, wherein each of the storage drives of a storage controller is coupled to each of the interface controllers of the storage enclosure, and wherein each interface controller comprises;
 a host port;
 an expansion port; and
 an expander device, wherein the expander device is coupled between the host port, the expansion port, and each storage drive of the storage enclosure.

5. The cluster network of claim 4, wherein each storage drive is a dual port SAS drive.

6. The cluster network of claim 5, wherein expander device is an SAS edge expander.

7. The cluster network of claim 6, wherein each storage drive of each storage enclosure is included as a storage drive of a RAID array.

8. An architectural topology for a cluster network, comprising:

a first grouping of storage enclosures, wherein the first grouping of storage enclosures includes a first storage enclosure and a terminal storage enclosure;

a second grouping of storage enclosures, wherein the second grouping of storage enclosures includes a first storage enclosure and a terminal storage enclosure;

wherein each of the storage enclosures of the first grouping and the second grouping, comprises:
 a first interface having first and second ports;
 a second interface having first and second ports;

wherein the second ports of the terminal storage enclosure of the first grouping of storage enclosures are coupled to one another;

wherein the second ports of the terminal storage enclosure of the second grouping of storage enclosures are coupled to one another;

wherein the first ports of each of the terminal storage enclosures are coupled to respective second ports of the first storage enclosures;

wherein the first ports of each of the first storage enclosures are coupled to a first server node; and wherein the second ports of each of the first storage enclosures are coupled to a second server node.

9. The architectural topology for a cluster network of claim 8, wherein each storage enclosure includes a plurality of drives, each of which is coupled to each interface of the storage enclosure.

10. The architectural topology for a cluster network of claim 9, each storage drive comprises a dual port SAS drive.

11. The architectural topology for a cluster network of claim 10, wherein each interface includes an expander unit coupled between the first port, the second port, and each storage drive of the storage enclosure.

12. The architectural topology for a cluster network of claim 11, wherein the expander unit of each interface is an SAS edge expander.

13. The architectural topology for a cluster network of claim 12, wherein the first ports of the first interface of each of the first storage enclosures are coupled to a RAID controller in the first server node; and wherein the first ports of the second interface of each of the first storage enclosures are coupled to a RAID controller in the second server node.

14. The architectural topology for a cluster network of claim 13, wherein each storage drive of each storage enclosure is included as a storage drive of a RAID array.

15. The architectural topology for a cluster network of claim 14, wherein each RAID army is managed by one a RAID controller of the first server node or a RAID controller of the second server node.

16. A cluster network having a redundant communication link between server nodes, comprising:
 a first server node;
 a second server node;
 a plurality of storage enclosures grouped into a first set of storage enclosures and a second set of storage enclosures, wherein each set of storage enclosures comprises:
  a first storage enclosure having a first interface and a second interface;
  a second storage enclosure having a first interface and a second interface;
  wherein a communications link is provided between the first interface of the second storage enclosure and the second interface of the second storage enclosure;
  wherein the first interface of the first storage enclosure is operable to communicate with the first interface of the second storage enclosure;
  wherein the second interface of the first storage enclosure is operable to communicate with the second interface of the second storage enclosure; and
 wherein the first server node is directly coupled to the first interface of the first storage enclosure of the first set of storage enclosures;
 wherein the second server node is directly coupled to the second interface of the first storage enclosure of the second set of storage enclosures;
 wherein each server node may communicate with the other server node through the first interfaces and second interfaces of the storage enclosures in a set of storage enclosures despite the failure of one of the storage enclosures in the opposite set of storage enclosures.

17. The cluster network of claim 16, wherein each storage enclosure includes a plurality of dual port storage drives, wherein each of the storage drive is coupled to the first interface and the second interface of the associated storage enclosure.

18. The cluster network of claim 17, wherein each storage drive is a dual port SAS drive.

19. The cluster network of claim 18,
 wherein each server node includes a RAID storage controller;
 wherein the RAID storage controller of the first server node is coupled to the first interface of the first storage enclosure of the first set of storage enclosures; and wherein the RAID storage controller of the second server node is coupled to the second interface of the second storage enclosure of the second set of storage enclosures.

20. The cluster network of claim 19, wherein each storage drive of each storage enclosure is included as a storage drive of a RAID array.

21. A cluster network, comprising:
a first server node;
a second server node, wherein each of the first server node and the second server node includes a storage controller;
a first storage enclosure that includes first and second interface controllers, wherein the first interface controller of the first storage enclosure is coupled to the storage controller of the first server node, wherein the second interface controller is coupled to the storage controller of the second server node, and wherein the first interface controller of the first storage enclosure is coupled to the second interface controller of the first storage enclosure; and
a second storage enclosure that includes first and second interface controllers, wherein the first interface controller of the second storage enclosure is coupled to the storage controller of the second server node, wherein the second interface controller is coupled to the storage controller of the first server node, and wherein the first interface controller of the second storage enclosure is coupled to the second interface controller of the second storage enclosure;
whereby a communications pathway exists between the server nodes through the first and second interface controllers of a storage enclosure despite a failure of either of the first or second enclosures.

22. The cluster network of claim 21, wherein storage controller of the first server node and the storage controller of the second serve node is a RAID storage controller.

23. The cluster network of claim 21, wherein each storage enclosure includes a plurality of dual port storage drives, wherein each of the storage drives of a storage controller is coupled to each of the interface controllers of the storage enclosure.

24. The cluster network of claim 23, wherein each interface controller comprises:
a host port;
an expansion port; and
an expander device;
wherein the expander device is coupled between the host port, the expansion port each storage drive of the storage enclosure.

25. The cluster network of claim 24, wherein each storage drive is a dual port SAS drive.

26. The cluster network of claim 25, wherein expander device is an SAS edge expander.

27. The cluster network of claim 26, wherein each storage drive of each storage enclosure is included as a storage drive of a RAID array.

* * * * *